United States Patent [19]
Gordon et al.

[11] 4,100,236
[45] Jul. 11, 1978

[54] METHOD OF PREPARING MICRON SIZE PARTICLES OF SOLID POLYMERS

[75] Inventors: Gerald A. Gordon, Skokie; Karl Josephy, Chicago, both of Ill.

[73] Assignee: The Continental Group, Inc., New York, N.Y.

[21] Appl. No.: 742,402

[22] Filed: Nov. 16, 1976

[51] Int. Cl.² .................................................. B01J 2/06
[52] U.S. Cl. ........................................ 264/8; 264/11; 264/14
[58] Field of Search ................................ 264/14, 8, 11

[56] References Cited
U.S. PATENT DOCUMENTS

| | | | |
|---|---|---|---|
| 2,439,772 | 4/1948 | Gow | 264/8 |
| 3,042,970 | 7/1962 | Terenzl | 264/11 |
| 3,346,673 | 10/1967 | Last et al. | 264/8 |
| 3,450,184 | 6/1969 | Schnoring et al. | 264/11 |

FOREIGN PATENT DOCUMENTS 704,891  3/1954  United Kingdom .................. 264/11

Primary Examiner—Robert F. White
Assistant Examiner—James R. Hall
Attorney, Agent, or Firm—Paul Shapiro; Joseph E. Kerwin; William A. Dittmann

[57] ABSTRACT

Micron size polymer particles with narrow particle size distribution are prepared by dissolving the polymer in a suitable liquid solvent, impinging an atomized spray of the dissolved polymer on a moving film of a liquid in which the polymer is insoluble and then recovering the polymer particles from the resultant mixture of liquids.

10 Claims, No Drawings

METHOD OF PREPARING MICRON SIZE PARTICLES OF SOLID POLYMERS

BACKGROUND OF THE INVENTION

1. Field of the Invention

This invention relates to the art of preparing micron size particles of solid polymeric materials having narrow particle size distributions.

2. Prior Art

In many applications where polymeric materials are employed, it is advantageous to have the polymer in a narrow distribution of relatively small particles and particularly in the micron range, i.e., 0.1–10 microns. This is particularly the case when the intended use of the polymer is as a coating or adhesive material to be applied in the solid state, e.g., as by dispersion. For example, U.S. Pat. No. 3,616,047 discloses that when dispersions of polypropylene and carboxylated polypropylene are used as an adhesion promoting coating for bonding polypropylene closure members to enamel coated metal surfaces, improved adhesion results if the dispersed polymers have a particle size of less than 5 microns.

Although polymer particles of micron size of narrow distribution are desired by the art, small, uniformly sized particles are difficult to obtain. For example, the most convenient way of obtaining polypropylene particles of micron size is by direct polymerization. However, direct polymerization techniques have not been consistent in producing micron size polypropylene particles. Grinding of flake polypropylene has been tried but with very limited success as the procedure produces a broad distribution of particle sizes and the high cost of energy required to achieve the micron particle size places the product out of commercial consideration.

SUMMARY OF THE INVENTION

In accordance with the practice of the present invention there is provided a method for preparing solid polymer particles of relatively uniform micron size wherein the polymer is dissolved in a liquid solvent in which the polymer is soluble, the solution is atomized and then impinged, as by spraying, into a moving film of liquid in which the polymer is insoluble whereby micron polymer particles are recovered from the resultant liquid mixture.

PREFERRED EMBODIMENTS

The practice of the present invention is applicable to most thermoplastic polymers including ethylene polymers and copolymers such as polyethylene, ethylene-ethyl acrylate copolymers, ethylene-acrylic acid copolymers, ethylene-vinyl acetate copolymers, ethylene-propylene copolymers and propylene polymers. The method of the present invention is particularly useful with thermoplastic propylene polymers.

The term "propylene polymer" as used in the present specification includes within its meaning propylene homopolymer, i.e., polypropylene, and copolymers of propylene with other monomers both in the crystalline (isotatic or syndiotactic) and amorphous (atactic) forms. A propylene copolymer for which the practice of the present invention is particularly suited is the graft copolymer of polypropylene and an unsaturated dicarboxylic acid or anhydride such as maleic acid or anhydride and fumaric acid or anhydride. Graft polymers of polypropylene containing about 0.05 to about 10 percent by weight of the unsaturated dicarboxylic acid are well known to the art and are more fully described in U.S. Pat. No. 3,616,047 and Belgian Pat. No. 607,269, the teachings of which are herein incorporated by reference.

The choice of the solvent for the polymer is dependent upon the particular polymer. For example, suitable solvents for ethylene polymers include kerosene, Solvesso 150 (a mixture of high boiling substituted xylenes having a boiling range of 188°–210° C) and halogenated hydrocarbons having boiling points above 80° C.

The choice of solvents for the dissolution of propylene polymers is dependent upon the crystalline state of the polymer. For example, amorphous propylene polymers such as atactic polypropylene and graft copolymers thereof are soluble at room temperatures in a variety of common organic solvents e.g. hydrocarbons, chlorinated hydrocarbons, isoamyl acetate and diethyl ether. Crystalline propylene polymers such as isotactic polypropylene and graft copolymers thereof are insoluble at room temperature in most known solvents. However, at elevated temperatures of about 120° C and up, there are a number of high boiling organic solvents are particularly paraffin hydrocarbons such as kerosene, aromatic solvents such as amyl benzene and Solvesso 150 in which the polymer can be readily dissolved. Kerosene and Solvesso 150 are preferred solvents for isotactic propylene polymers because of low viscosity, appropriate boiling point range and low cost.

The concentrations at which the polymers are dissolved in the solvent are dependent on the physical properties of the polymer such as its molecular weight, but generally the concentration of polymer in the solvent is 50 grams/liter of solvent (g/ls) or less. For example, ethylene polymer solutions used in the practice of the present invention desirably contain about 0.1 to 20 g/ls of the ethylene polymer and preferably about 5 to about 10g/ls. Propylene polymers such polypropylene and polypropylene - maleic anhydride graft copolymers are dissolved in the solvent at a concentration of about 0.1 to about 20 g/ls and preferably 2 to 10 g/ls.

When the solvent is heated to elevated temperatures to dissolve the polymer it is desirable to include in the polymer solution 0.01 to 1% by weight of a heat stabilizer or antioxidant such as a hindered phenol type conventionally used for stabilization of polyolefins.

As will hereinafter be illustrated if the concentrations of the polymer solutions exceed the ranges discussed above, the solution viscosity will increase to a point where effective atomization is not possible, with the result that the particle size distribution will be substantially broadened with the presence of a significant fraction of larger particles and undesirable fibrous structures.

Proper atomization of the feed solution is thus critical to the production of a narrow particle size distribution of micron size particles, since the individual droplets formed in the atomization step determine the amount of material available to form an ultimate particle.

In preparing an atomized spray of the polymer solution any one of a variety of well known systems for liquid atomization may be employed. A review of these various atomization systems is found in an article entitled "Microencapsulation In The Food Technology," vol. 2, July 1971, pages 245-265.

A preferred system for effecting atomization of the polymer solution is by centrifugal disc atomization wherein atomization is effected by feeding the polymer solution, at a rate of 100–2500 cubic centimeters per minute (cc/min.), and preferably 400 to 2000 cc/min., to the surface of a rotating disc. The disc having a diameter of 2 to 6 inches discharges the polymer solution radially from its periphery and is rotated at high speeds, e.g. 5000–80,000 revolutions per minute (rpm). The degree of atomization is a function of such factors as disc peripheral speed, disc diameter and as already discussed the physical properties of the solution, namely, viscosity.

To effect precipitation of the dissolved polymer, the atomized polymer solution is impinged on a moving film of a liquid which is nonsolvent for the polymer. Typical nonsolvents for polyethylene and propylene polymers include most organic solvents at room temperature. Typical nonsolvents include hexane, acetone, benzene, ethyl ether and xylene. Aliphatic alcohols such as isopropanol and butanol are nonsolvents for most thermoplastic polymers and are preferred in the practice of the present invention.

To obtain a moving film of liquid nonsolvent, the nonsolvent is conveniently fed to the walls of a chamber and allowed to flow down the walls of the chamber as a thin, steady stream. The polymer solution is then impinged on the moving film from an atomizer located in the chamber from which the atomized solution is sprayed into the moving film. The nonsolvent is generally fed to the walls of the chamber at such a rate that the film thickness at the top of the wall is between 0.1 and 2.0 centimeters (cm.) and preferably between 0.2 and 1.0 cm. which thicknesses are sufficient to wet the walls of the chamber and provide a medium wherein the polymer is caused to precipitate as fine micron particles.

Following the impingement of the atomized polymer solution on the moving film of nonsolvent, the resultant product is a liquid dispersion of micron sized particles having a milky appearance. The particles come out of suspension readily but remain uncompacted upon sitting and are easily resuspended by simple agitation, e.g., by shaking.

The dispersions may be filtered to recover the solid polymer particles or they may be concentrated as by centrifugation and evaporation to obtain a product which may be directly used in coating applications. The removal of the nonsolvent may be effected by fractional evaporation or by selective extraction by solvents in which the liquid nonsolvent is soluble but in which the polymer solution is immiscible. For example, adding water to concentrated dispersions of propylene polymers in a mixture of a kerosene solvent and an isopropanol nonsolvent causes the isopropanol to dissolve in the water and the remaining dispersion of polypropylene in kerosene to separate from the water fraction which is readily decanted. This dispersion maybe be used directly in coating applications or additional kerosene may then be added to adjust the polymer concentration so that the dispersion will have the flow properties required for coating applications. Useful solids concentrations for coating applications are in the range of 1–10% by weight and a concentration range of 3 to 7% by weight is preferred.

In preparing the polymer particles according to the process of the invention the polymer solution can be made up containing all the essential ingredients of a coating formulation so that further compounding is unnecessary. Thus for use as a bond promoting coating as disclosed in U.S. Pat. No. 3,616,047 a homogenous mixture of polypropylene and a carboxylated polypropylene can be simultaneously dissolved in a common solvent and coating formulations containing mixtures of the two materials of the desired particle size can be prepared directly.

The practice of the present invention is demonstrated by the following Examples.

EXAMPLE I

A series of runs were made wherein various solid polymer materials either in pellet or powder form were dissolved in kerosene heated to 150°–190° C at varying concentrations. The heated solutions were fed at the rate of 100–2000 cc/min. to a Bowen AT-4, ½ horse power, centrifugal disc atomizer provided with a 2 inch diameter disc which was rotated at a speed of 20,000–60,000 rpm. At this speed the disc discharged the polymer solution from its periphery in atomized droplets. The disc atomizer was mounted in the center of cylinderical chamber constructed of stainless steel having a height of 5 feet and a diameter of 32 inches. The atomized polymer solution was impinged on a continuous surface of isopropanol which flowed down the interior walls of chamber at a rate sufficient to maintain the walls of the chamber in a wet condition. The impingement of the atomized polymer solution on the isopropanol wetted walls of the chamber caused the polymer to precipitate. The mixture at the end of the run was composed by precipitated polymer and about equal parts of isopropanol and kerosene. The mixture was centrifuged to concentrate the particles. Analysis by a Coulter Counter indicated that the particles were predominantly between about 0.5 and 3 microns ($\mu$m) in diameter.

Dispersions containing 1–10% by weight of the polymer for direct use as coating materials were prepared from the mixture by vacuum evaporation of the isopropanol from the mixture, or by adding water to the mixture whereby the isopropanol dissolved in the water and the dispersion of the polymer in kerosene separated from the water, which was then decanted. The materials used to prepare feed solutions in the series of runs are listed below.

| Polymer Designation | Solvent | Polymer |
|---|---|---|
| A. | Kerosene | Polypropylene*, melt index 30 |
| B. | Kerosene | Polypropylene*, melt index 10–12 |
| C. | Kerosene | Ethylene/vinyl acetate copolymer** |
| D. | Kerosene | Ethylene/ethyl acrylate copolymers*** |
| E. | Kerosene | Mixture of 95% polymer A+5% polypropylene/maleic anhydride graft copolymer**** |
| F. | Kerosene | Mixture of 61% polymer A, 35% polymer C and 4% polypropylene/maleic anhydride copolymer.**** |
| G. | Kerosene | Polypropylene*, melt index 4 |
| H. | Solvesso 150 | Polymer E |

*crystalline polypropylene
**10% vinyl acetate
***12–18% ethyl acrylate
****0.6–1.0% maleic anhydride The conditions under which the series of runs were conducted is summarized in Table below.

TABLE I

| Run No. | Polymer | Solvent Temp. °C | Conc. Polymer in Solvent (g/ls) | Disc. Speed (rpm) | Feed Rate (cc) | Polymer Particle Size in 0.5-3μm range |
|---|---|---|---|---|---|---|
| 1. | A | 180° | 0.5 | 50,000-60,000 | 500 | Yes |
| 2. | A | 150° | 0.5 | 50,000-60,000 | 500 | Yes |
| 3. | A | 180° | 0.6 | 50,000-60,000 | 600 | Yes |
| 4. | A | 180° | 0.6 | 20,000-30,000 | 500 | Yes |
| 5. | A | 180° | 1.0 | 50,000-60,000 | 450 | Yes |
| 6. | A | 180° | 2.0 | 50,000-60,000 | 130 | No |
| 7. | A | 180° | 1.0 | 10,000-20,000 | 450 | No |
| 8. | A | 190° | 1.5 | 50,000-60,000 | 1100 | Yes |
| 9. | A | 180° | 1.0 | 50,000-60,000 | 1500 | Yes |
| 10. | B | 190° | 0.3 | 50,000-60,000 | 500 | Yes |
| 11. | B | 190° | 0.5 | 50,000-60,000 | 500 | Yes |
| 12. | B | 180° | 0.5 | 20,000-30,000 | 500 | Yes |
| 13. | C | 180° | 0.5 | 50,000-60,000 | 450 | Yes |
| 14. | D | 180° | 0.5 | 50,000-60,000 | 400 | Yes |
| 15. | E | 180° | 0.5 | 50,000-60,000 | 400 | Yes |
| 16. | E | 180° | 0.5 | 50,000-60,000 | 2100 | Yes |
| 17. | F | 180° | 0.5 | 50,000-60,000 | 450 | Yes |
| 18. | G | 180° | 0.5 | 50,000-60,000 | 650 | Yes |
| 19. | H | 160° | 0.5 | 50,000-60,000 | 2000 | Yes |

EXAMPLE II

The ability of the process of the present invention to reproducibly produce particles of micron size with a very narrow particle size distribution was demonstrated when Run Number 1 of Example I was repeated seven separate times and the particle size distribution determined using a Coulter Counter. The results are summarized in Table II below.

TABLE II

| Run No. | Particle size below which a given percentage of the precipitated particles lie. | | |
|---|---|---|---|
| | 20% (μm) | 50% (μm) | 80% (μm) |
| 1a | 0.75 | 1.25 | 2.60 |
| 1b | 0.71 | 1.15 | 3.00 |
| 1c | 0.72 | 0.95 | 1.35 |
| 1d | 0.72 | 1.15 | 2.50 |
| 1e | 0.79 | 1.20 | 1.90 |
| 1f | 0.77 | 1.20 | 1.85 |
| 1g | 0.75 | 1.25 | 2.90 |
| Average Particle Size | 0.74 | 1.16 | 2.30 |
| Standard deviation | 0.03 | 0.10 | 0.60 |

EXAMPLE III

A dispersion containing 5 g/ls of polymer E prepared in accordance with Example I was applied to an aluminum foil surface with an air knife coating apparatus and the coated surface was baked at 400° F to volatilize the solvent, fuse and coalesce the dispersed particles into a continuous film. The weight of the solid polymer applied to the foil was 0.04–0.07 pounds/1000 square feet. The hot coated aluminum foil surface was then laminated to a film of polypropylene. The peel strength of the laminated assembly was found to be 2200–3300 grams/inch.

What is claimed is:

1. A method of preparing micron sized polymer particles which comprises preparing a homogeneous solution of the polymer in a normally liquid organic material which is a solvent for the polymer, the concentration of the polymer in the solvent being in the range of about 0.1 to 50 grams/liter of solvent, atomizing the solution, impinging the atomized solution into a moving film of liquid which is a nonsolvent for the polymer, and then recovering a dispersion of precipitated micron sized particles in the mixture of organic solvent and nonsolvent.

2. The method of claim 1 wherein the polymer is an ethylene polymer.

3. The method of claim 1 wherein the polymer is a propylene polymer.

4. The method of claim 1 wherein the solid polymer is dissolved in the organic solvent at a concentration of about 0.1 to about 20 grams/liter of solvent.

5. The method of claim 1 wherein the polymer solution is atomized by a centrifugal disc atomizer having a disc diameter of 2 to 6 inches and rotated at 20,000 to 60,000 revolutions per minute and the polymer solution is fed to the disc at a rate of 100 to 2000 cc/min.

6. The method of claim 1 wherein the solvent is a paraffin hydrocarbon.

7. The method of claim 1 wherein the solvent is an aromatic hydrocarbon.

8. The method of claim 1 wherein the nonsolvent is an aliphatic alcohol.

9. The method of claim 1 wherein the precipitated particles are of 0.1 to 10 microns in diameter.

10. The method of claim 1 wherein the nonsolvent is removed from the mixture.

* * * * *